(12) United States Patent
Jang et al.

(10) Patent No.: US 9,641,042 B2
(45) Date of Patent: May 2, 2017

(54) FAN MOTOR

(71) Applicant: NEW MOTECH CO., LTD., Gwangju (KR)

(72) Inventors: Jeong Cheol Jang, Gwangju (KR); Gyeong Su Park, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 202 days.

(21) Appl. No.: 14/651,670

(22) PCT Filed: Jan. 20, 2014

(86) PCT No.: PCT/KR2014/000565
§ 371 (c)(1),
(2) Date: Jun. 12, 2015

(87) PCT Pub. No.: WO2014/129751
PCT Pub. Date: Aug. 28, 2014

(65) Prior Publication Data
US 2015/0318756 A1  Nov. 5, 2015

(30) Foreign Application Priority Data

Feb. 25, 2013  (KR) .................. 10-2013-0019620

(51) Int. Cl.
*H02K 5/16* (2006.01)
*F04D 25/08* (2006.01)
(Continued)

(52) U.S. Cl.
CPC ........... *H02K 5/161* (2013.01); *F04D 25/088* (2013.01); *H02K 3/522* (2013.01); *H02K 5/04* (2013.01);
(Continued)

(58) Field of Classification Search
CPC .... H02K 5/1672; H02K 5/1732; H02K 7/083; H02K 15/028; H02K 5/02; H02K 15/14
(Continued)

(56) References Cited

U.S. PATENT DOCUMENTS 4,326,757 A * 4/1982 Ozaki ................. H02K 5/1672
                                                            310/90
4,924,127 A * 5/1990 Boireau ............... F16C 23/045
                                                            310/89
(Continued)

FOREIGN PATENT DOCUMENTS

JP  2002-051501 A  2/2002
KR  10-0511324 A   8/2005
(Continued)

OTHER PUBLICATIONS

International Search Report for PCT/KR2014/000565 mailed Mar. 26, 2014 from Korean Intellectual Property Office.

*Primary Examiner* — Thanh Lam
(74) *Attorney, Agent, or Firm* — Revolution IP, PLLC

(57) ABSTRACT

A fan motor including: a lower bracket through which a rotary shaft passes and having a lower bearing insertion space formed around the rotary shaft; an upper bracket through which the rotary shaft passes and having an upper bearing insertion space formed around the rotary shaft; a lower bearing forcedly pressed and fixed at a lower bearing seating portion formed above the lower bearing insertion space; an upper bearing forcedly pressed and fixed at an upper bearing seating portion formed above the upper bearing insertion space; a rotor rotatably joined to the rotary shaft inside the upper bracket; a stator located around the rotor; a lower felt cover having a lower bearing supporting portion for supporting the lower portion of the lower bearing; and an upper felt cover having an upper bearing supporting portion for supporting the lower portion of the upper bearing.

6 Claims, 5 Drawing Sheets

(51) Int. Cl.
   *H02K 3/52*      (2006.01)
   *H02K 5/04*      (2006.01)
   *H02K 5/167*     (2006.01)
   *F25D 21/04*     (2006.01)
   *H02K 15/12*     (2006.01)
   *H02K 5/22*      (2006.01)

(52) U.S. Cl.
   CPC .......... *H02K 5/1672* (2013.01); *F25D 21/04* (2013.01); *F25D 2317/0681* (2013.01); *H02K 5/225* (2013.01); *H02K 15/12* (2013.01); *H02K 2203/03* (2013.01)

(58) Field of Classification Search
   USPC ............................................ 310/89–90, 67 R
   See application file for complete search history.

(56) References Cited

U.S. PATENT DOCUMENTS

| | | | | |
|---|---|---|---|---|
| 5,494,356 A | * | 2/1996 | Strobl | ............... F16C 23/04 29/898.043 |
| 5,610,462 A | * | 3/1997 | Takahashi | ............ H02K 5/1675 310/90 |
| 5,798,589 A | * | 8/1998 | Ohi | ................... F16C 23/04 310/90 |
| 6,018,206 A | * | 1/2000 | Corbett | ............... H02K 5/1672 310/45 |
| 6,577,031 B2 | | 6/2003 | Morooka et al. | |
| 8,057,195 B2 | | 11/2011 | Lee et al. | |
| 2007/0176504 A1 | * | 8/2007 | Otsuki | ................... F16C 17/08 310/90.5 |
| 2012/0169155 A1 | | 7/2012 | Jang et al. | |
| 2013/0323094 A1 | | 12/2013 | Jang et al. | |
| 2014/0246936 A1 | | 9/2014 | Jang et al. | |

FOREIGN PATENT DOCUMENTS

| | | |
|---|---|---|
| KR | 10-2008-0105795 A | 12/2008 |
| KR | 10-0917197 B1 | 9/2009 |
| KR | 10-2010-0027899 A | 3/2010 |
| KR | 10-2010-0030515 A | 3/2010 |
| KR | 10-0987067 B1 | 10/2010 |
| KR | 10-1074935 B1 | 10/2011 |
| KR | 10-1228664 B1 | 1/2013 |
| WO | 2012-141416 A1 | 10/2012 |

\* cited by examiner

FAN MOTOR

CROSS REFERENCE TO PRIOR APPLICATIONS

This application is a National Stage Application of PCT International Patent Application No. PCT/KR2014/000565 filed on Jan. 20, 2014, under 35 U.S.C. §371, which claims priority to Korean Patent Application No. 10-2013-0019620 filed on Feb. 25, 2013, which are all hereby incorporated by reference in their entirety.

TECHNICAL FIELD

The present invention relates to a fan motor, and more particularly, to a fan motor which can reduce manufacturing expenses because the manufacturing process is simple, which can effectively prevent infiltration of the outside moisture, and which can reduce the number of components supporting a bearing.

BACKGROUND ART

In general, a motor which is used for blowing cold air of a refrigerator or for circulating the inside air and the outside air of some devices is called a fan motor. Such a fan motor is mainly installed in a place where there is much moisture or in a place where there is a dew condensation due to a change in temperature. Therefore, because the motor may be out of order due to infiltration of moisture into the motor, various structures for preventing the infiltration of moisture have been studied.

Korean Patent Nos. 10-05111324 and 10-1074935, and U.S. Pat. No. 6,577,031 respectively disclose technologies to manufacture a motor housing by resin molding through an insert injection molding of all of a stator, a printed circuit board and other components of a motor. The inventions according to the cited references have an effective structure to prevent infiltration of moisture into the motor because the motor housing is manufactured by resin molding such that the stator and the printed circuit board are buried inside the motor housing. However, such a method of manufacturing the motor by the insert molding has a disadvantage in that processes and expenses required for the insert molding, for instance, in manufacturing a mold, are increased. Moreover, the method of manufacturing the motor by the insert molding has another disadvantage in that it is difficult to automate all of the processes because the method needs the insert injection molding process.

In the meantime, a conventional fan motor includes a member, such as a plate spring or a board push, disposed at a place where a bearing is located in order to align, restrict and maintain the bearing joined to a rotary shaft. Korean Patent Nos. 10-0917197 and 10-0987067 respectively disclose a fan motor of such a type.

Such fan motors have a disadvantage in that processes for assembling the bearing and the number of components are increased because the plate spring is applied.

Therefore, in order to solve the above-mentioned problems, a new fan motor that the stator is located inside the bracket, the printed circuit board is sealably mounted outside of the bracket, and the board push is not used is proposed.

DISCLOSURE OF INVENTION

Technical Problem

Accordingly, the present invention has been made in an effort to solve the above-mentioned problems occurring in the prior arts, and it is an object of the present invention to provide a fan motor of a new structure.

It is another object of the present invention to provide a fan motor which does not require insert injection molding for manufacturing a motor housing so as to reduce manufacturing costs.

It is a further object of the present invention to provide a fan motor which does not use a board push.

The above and other objects, features and advantages of the present invention will be apparent from the following detailed description of the preferred embodiments of the invention in conjunction with the accompanying drawings.

Solution to Problem

To achieve the above objects, the present invention provides a fan motor including: a lower bracket through which a rotary shaft passes at the central portion thereof, the lower bracket having a lower bearing insertion space formed around the rotary shaft outside of the central portion; an upper bracket through which the rotary shaft passes at the central portion thereof, the upper bracket having an upper bearing insertion space formed around the rotary shaft and opened at the lower portion of the upper bearing insertion space; a lower bearing forcedly pressed and fixed at a lower bearing seating portion formed above the lower bearing insertion space; an upper bearing forcedly pressed and fixed at an upper bearing seating portion formed above the upper bearing insertion space; a rotor rotatably joined to the rotary shaft inside the upper bracket; a stator located around the rotor; a lower felt cover having a lower bearing supporting portion for supporting the lower portion of the lower bearing; and an upper felt cover having an upper bearing supporting portion for supporting the lower portion of the upper bearing.

Moreover, the fan motor further includes a lower felt located around the lower bearing and a lower felt supporting portion formed around the lower bearing supporting portion of the lower felt cover for supporting the lower felt.

Furthermore, the fan motor further includes an upper felt located around the upper bearing, and an upper felt supporting portion formed around the upper bearing supporting portion of the upper felt cover for supporting the upper felt.

In another aspect of the present invention, there is a fan motor including: a lower bracket through which a rotary shaft passes at the central portion thereof, the lower bracket having a lower bearing insertion space formed around the rotary shaft outside of the central portion; an upper bracket through which the rotary shaft passes at the central portion thereof, the upper bracket having an upper bearing insertion space formed around the rotary shaft and opened at the upper portion of the upper bearing insertion space; a lower bearing forcedly pressed and fixed at a lower bearing seating portion formed above the lower bearing insertion space; an upper bearing forcedly pressed and fixed at an upper bearing seating portion formed below the upper bearing insertion space; a rotor rotatably joined to the rotary shaft inside the upper bracket; a stator located around the rotor; a lower felt cover having a lower bearing supporting portion for supporting the lower portion of the lower bearing; and an upper felt cover having an upper bearing supporting portion for supporting the lower portion of the upper bearing.

The felt cover according to the preferred embodiment of the present invention includes: a circular base; a felt supporting portion protrudingly formed on the base; and a bearing supporting portion protruding from the inner face of the felt supporting portion and being formed in parallel with the felt supporting portion, wherein the bearing supporting portion comprises at least two cut portions.

Moreover, the base comprises an oil return washer insertion portion formed at the central part thereof and below the bearing supporting portion.

Advantageous Effects of Invention

According to the exemplary embodiments of the present invention, the fan motor can reduce manufacturing costs and automate all of the manufacturing processes because it does not require insert injection molding for manufacturing the motor housing, and can support the bearing without using the board push.

Hereinafter, reference will be now made in detail to the preferred embodiment of the present invention with reference to the attached drawings.

MODE FOR THE INVENTION

Figure 1:
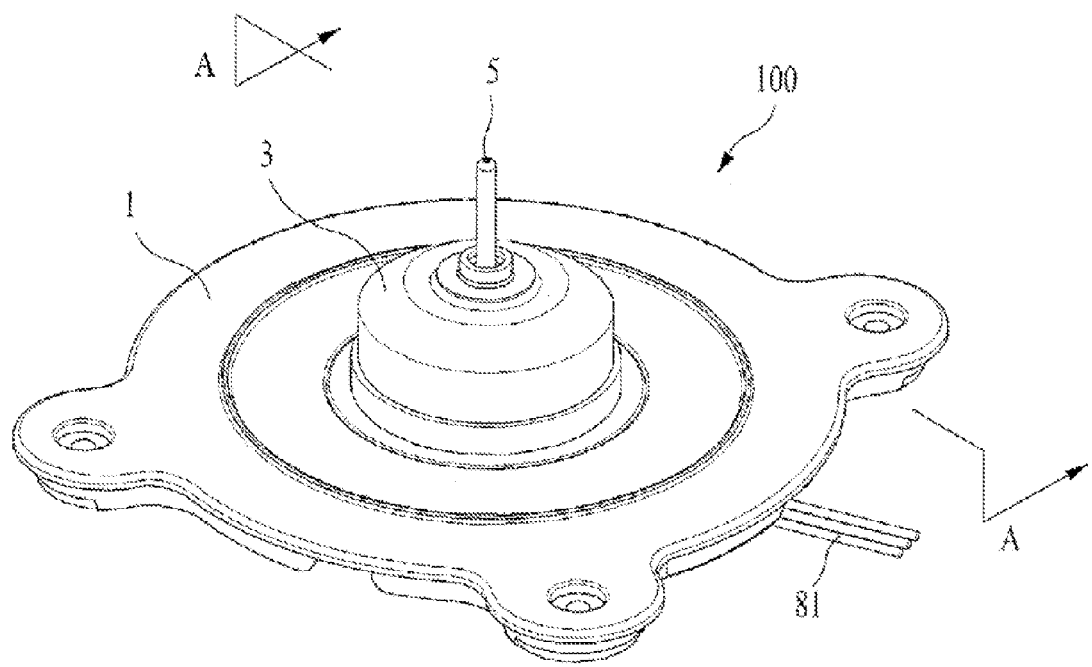
FIG. 1 is a perspective view of a fan motor according to a preferred embodiment of the present invention.

FIG. 1 is a perspective view of a fan motor according to a preferred embodiment of the present invention.

As shown in FIG. 1, the fan motor 100 according to the preferred embodiment of the present invention viewed from the outside includes a lower bracket 1, an upper bracket 3 and a rotary shaft 5. The lower bracket 1 and the upper bracket 3 are constructed by plastic injection molding and are joined with each other, and it is preferable that the lower bracket 1 and the upper bracket 3 have a sealed structure by ultrasonic fusion in order to prevent infiltration of outside moisture. A stator, a rotor and the rotary shaft are located inside the upper bracket 3, and a printed circuit board for supplying electric power to the stator and controlling rotation of a motor is located at a lower part outside of the lower bracket 1. Therefore, a wire 81 connected with the printed circuit board protrudes outwardly from the power part of the lower bracket 1.

Figure 2:
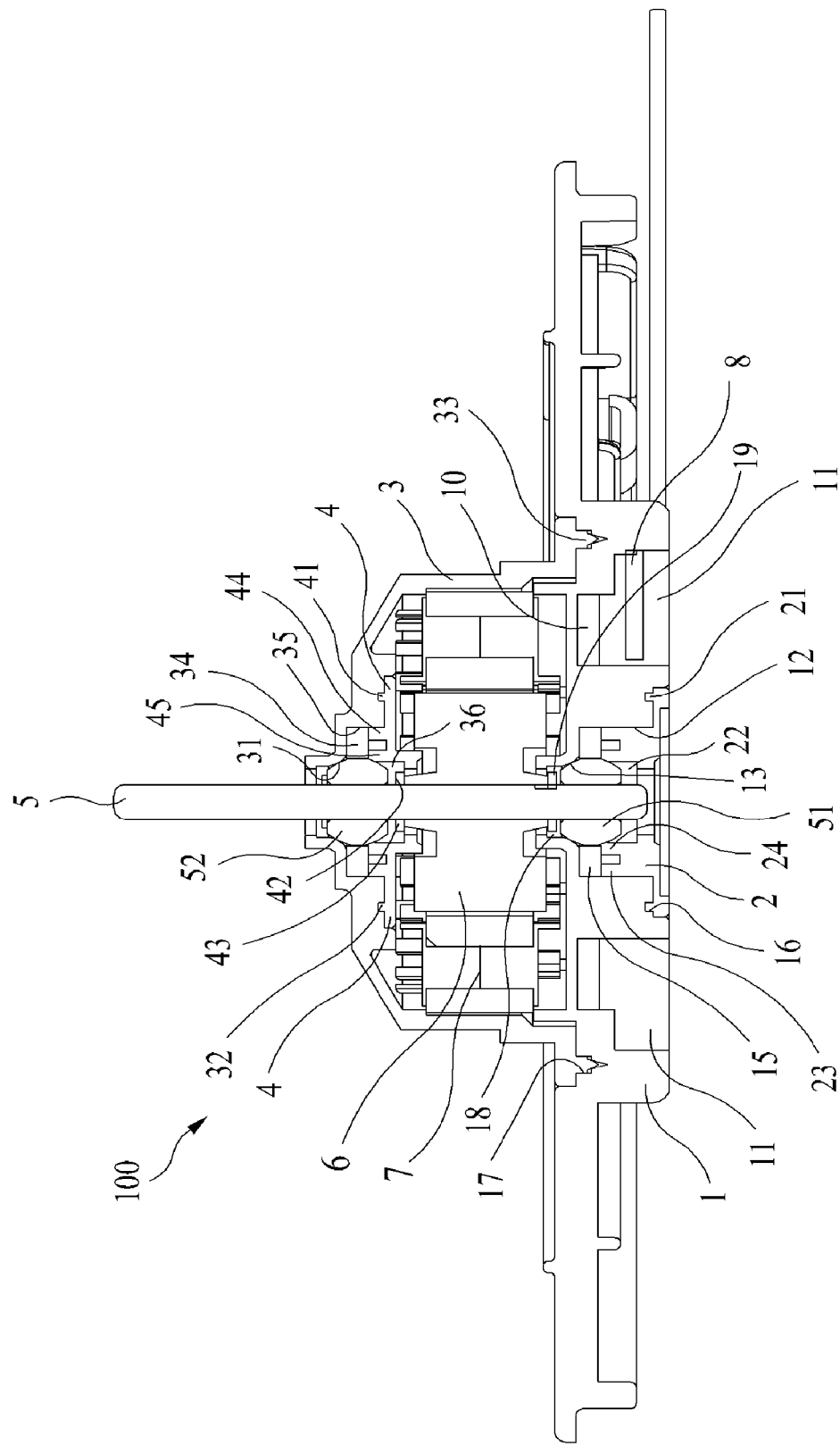
FIG. 2 is a sectional view taken along the line of A-A of FIG. 1, showing the fan motor.

FIG. 2 is a sectional view taken along the line of A-A of FIG. 1, showing the fan motor.

As shown in FIG. 2, the fan motor 100 according to the preferred embodiment of the present invention forms a housing of a motor in a state where the lower bracket 1 and the upper bracket 3 are joined together. In the state where the lower bracket 1 and the upper bracket 3 are joined together, the rotor 6 and the stator 7 are located in an interior space formed by the lower bracket 1 and the upper bracket 3. The lower bracket 1 has a bracket joining groove 17, and the upper bracket 3 has a bracket joining protrusion 33 formed corresponding to the bracket joining groove 17. Preferably, the bracket joining groove 17 is a little smaller than the bracket joining protrusion 33, such that the bracket joining protrusion 33 is forcedly pressed into the bracket joining groove 17. More preferably, the bracket joining protrusion 33 is sealably fixed to the bracket joining groove 17 through ultrasonic fusion. Of course, it is also possible that the bracket joining groove 17 be in a protrusion form and the bracket joining protrusion 33 be in a groove form.

The printed circuit board (PCB) 8 is inserted into a PCB insertion space 11 formed in a lower exterior space of the lower bracket 1. A coil (not shown) wound on the stator 7 must be electrically connected with the printed circuit board 8. For this, the lower bracket 1 has a coil path 10 penetrating through the lower bracket for passing the coil therethrough. After the printed circuit board 8 is inserted into the PCB insertion space 11, the remaining space except the space where the printed circuit board 8 occupies in the PCB insertion space 11 is filled with sealing material (See 82 in FIG. 6).

The rotary shaft 5 is located penetrates through the central parts of the lower bracket 1 and the upper bracket 3. The rotary shaft 5 is rotatably supported by an upper bearing 52 located inside the central part of the upper bracket 3 in a state where its lower portion is rotatably supported by a lower bearing 51.

The lower bearing 51 is located in a lower bearing insertion space 12 formed at the central part of the lower bracket 1, and the upper portion of the lower bearing 51 is forcedly pressed and fixed to a lower bearing seating portion 13 formed above the central part of the lower bearing insertion space 12. A lower portion of the lower bearing 51 is supported by a lower bearing supporting portion 24 formed on a lower felt cover 2. A lower felt 15 is mounted on an outer circumferential surface of the lower bearing 51 for supplying oil which is lubricating oil for rotating the bearing. A lower oil return washer insertion portion 18 is formed above the lower bearing seating portion 13, and a lower oil return washer 19 is inserted into the lower oil return washer insertion portion 18 so as to prevent that oil flows out toward the upper portion of the lower bearing 51.

The lower bearing insertion space 12 of the lower bracket 1 in which the lower bearing 51 is located is covered and sealably joined by the lower felt cover 2. For this, a lower joining groove 16 is formed around the lower bearing insertion space 12 of the lower bracket 1, and the lower felt cover 2 has a lower joining protrusion 21 formed corresponding to the lower joining groove 16. Preferably, the lower joining protrusion 21 is sealably joined to the lower joining groove 16 by ultrasonic fusion, such that the lower bearing insertion space 12 is perfectly isolated from the outside so as to prevent infiltration of moisture from the outside. Of course, it is also possible that the lower joining groove 16 be in a protrusion form and the lower joining protrusion 21 be in a groove form. The lower felt cover 2 includes a space portion 22 formed inside the central part thereof, and an end of the rotary shaft 5 is located in the space portion 22.

The upper bearing 52 is inserted into an upper bearing insertion space 35 of the upper bracket 3, and is forcedly pressed and fixed to an upper bearing seating portion 31 formed inside the central part of the upper bracket 3. A lower portion of the upper bearing 52 is supported by an upper bearing supporting portion 45 formed on an upper felt cover 4. An upper felt cover 34 is located on the outer circumferential surface of the upper bearing 52, and contains oil for smoothly rotating the bearing. The upper bearing insertion space 35 in which the upper bearing 52 is inserted is covered by the upper felt cover 4. For this, the upper bracket 3 has an upper joining groove 32, and the upper felt cover 4 has an upper joining protrusion 41 formed corresponding to the upper joining groove 32. Preferably, the upper joining groove 41 is fused and sealably joined to the upper joining groove 32 by ultrasonic fusion. Of course, it is also possible that the upper joining groove 32 be in a protrusion form and the upper joining protrusion 41 be in a groove form.

The upper felt cover 4 has an upper oil return washer insertion portion 42 formed inside the central part thereof. An upper oil return washer 43 is inserted into the upper oil return washer insertion portion 42 so as to prevent oil from leaking to the lower portion of the upper bearing 52.

Figure 3:
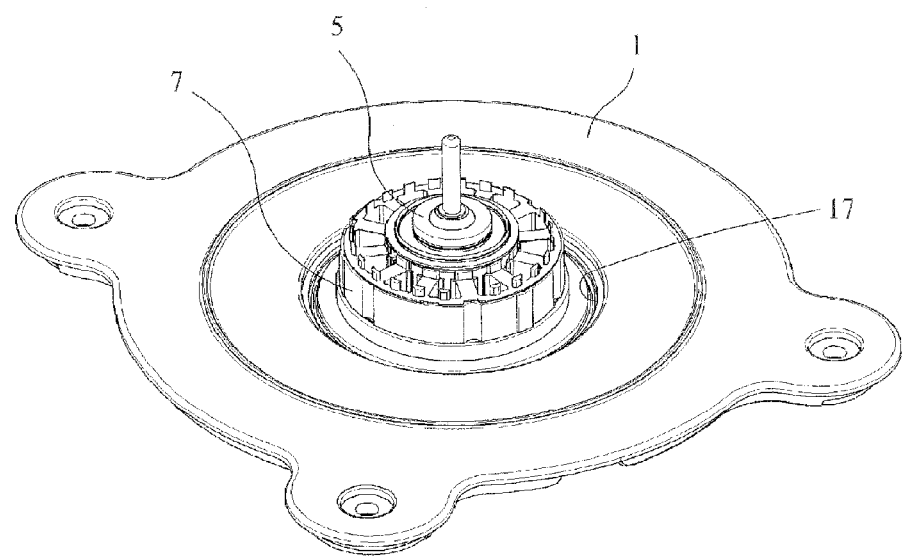
FIG. 3 is a perspective view showing a state where an upper bracket is removed from the fan motor.

FIG. 3 is a perspective view showing a state where an upper bracket is removed from the fan motor. Referring to FIG. 3, the fan motor 100 according to the preferred embodiment of the present invention is manufactured through the steps of locating the rotary shaft 5, the rotor 6 and the stator 7 in the lower bracket 1 and joining the upper bracket 3 to the lower bracket 1. Preferably, the upper bracket 3 is joined to the lower bracket 1 through ultrasonic fusion. Therefore, compared with the conventional method of forming the housing of the motor by insert injection molding, the present invention is easier and can lower manufacturing costs.

Figure 4:
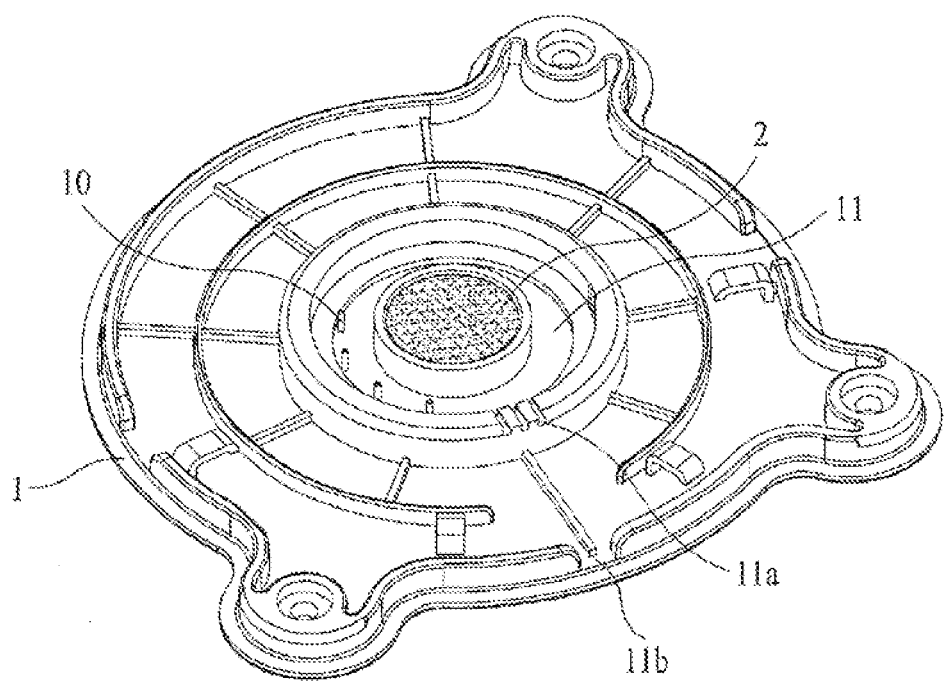
FIG. 4 is a bottom perspective view showing a state of the fan motor before a printed circuit board is joined to the fan motor.
Figure 5:
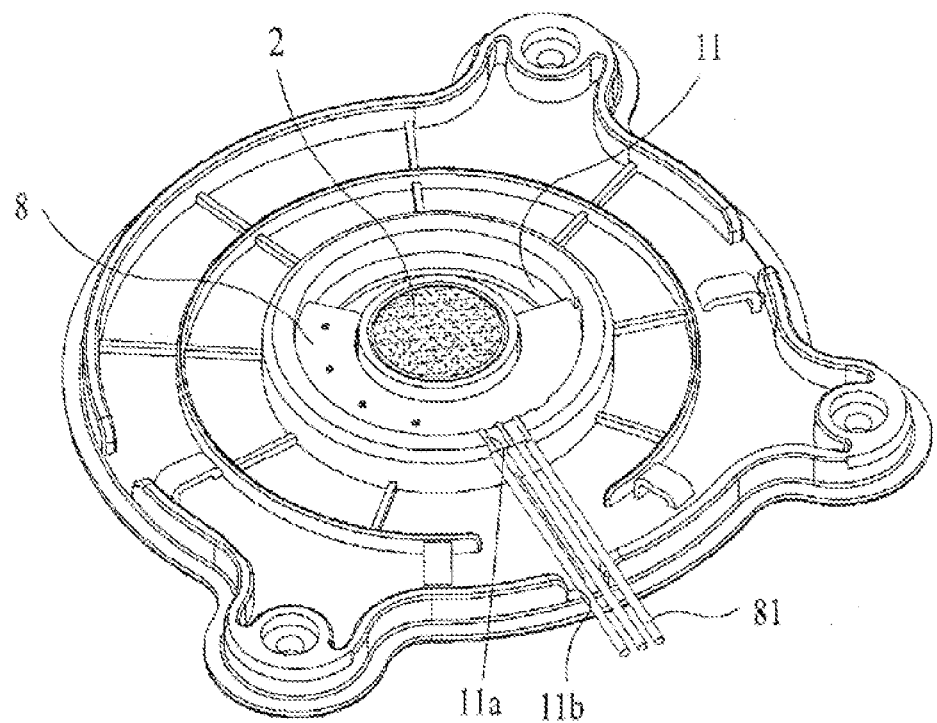
FIG. 5 is a bottom perspective view showing a state where the printed circuit board is joined to the fan motor.
Figure 6:
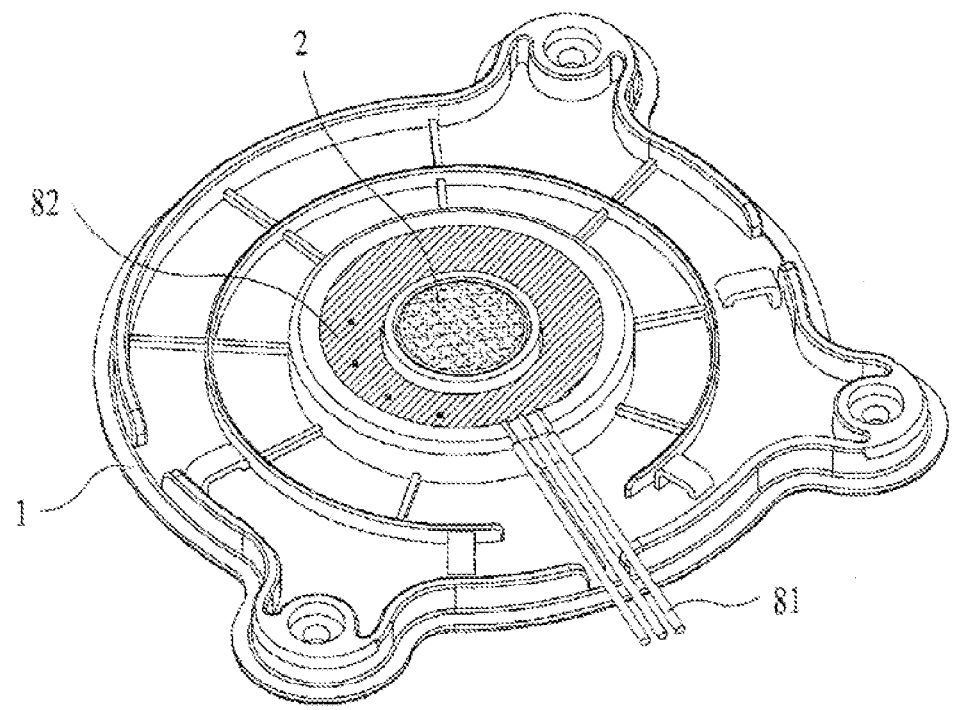
FIG. 6 is a bottom perspective view of the fan motor.

FIG. 4 is a bottom perspective view showing a state of the fan motor before a printed circuit board is joined to the fan motor, FIG. 5 is a bottom perspective view showing a state where the printed circuit board is joined to the fan motor, and FIG. 6 is a perspective view showing a state where sealing material fills around the printed circuit board 8 of the fan motor 100.

Referring to FIG. 4, the printed circuit board 8 is inserted into the PCB insertion space 11 formed in a lower exterior space of the lower bracket 1. A coil (not shown) wound on the stator 7 is electrically connected with the printed circuit board 8 through the coil path 10 formed in the lower bracket 1. Referring to FIG. 5, the printed circuit board 8 is connected with an exterior power supply through the wire 81. In order to pass the wire 81, a wire groove 11a is formed at a portion of the outer circumference of the PCB insertion space 11, and a wire pass hole 1 lb for passing and adjusting the wire is formed in the outermost side of the lower portion of the lower bracket 1.

As shown in FIG. 6, after the printed circuit board 8 is inserted into the PCB insertion space 11, the remaining space is filled with a sealing material 82. The sealing material may be one selected from various materials, such as urethane molding, sealant, thermosetting adhesive, and so on.

Figure 7:
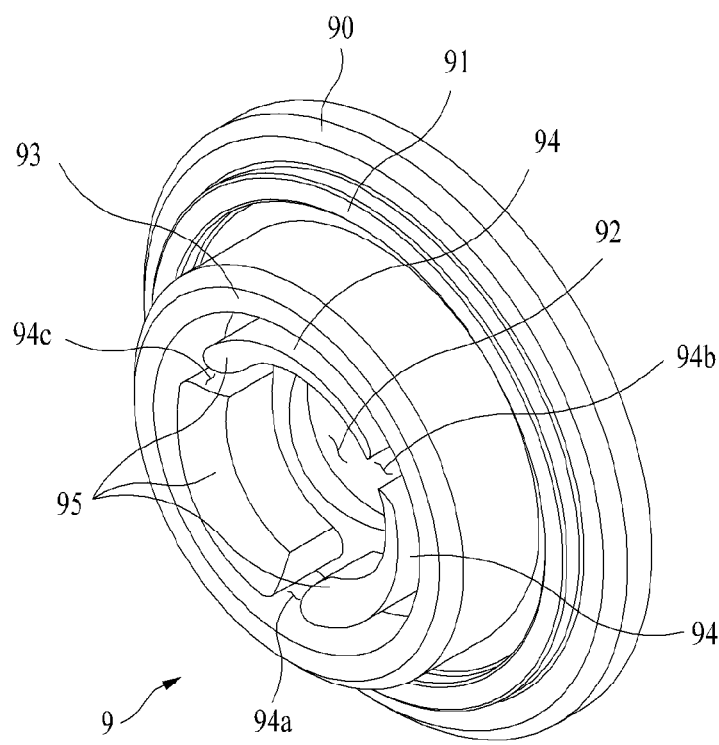
FIG. 7 is a perspective view of a felt cover used to the fan motor.

FIG. 7 is a perspective view of a felt cover used to the fan motor.

Referring to FIG. 7, a felt cover 9 of FIG. 7 may be identical with the lower felt cover 2 or the upper felt cover 4 described above, but, for convenience of description, a different reference numeral is designated.

The felt cover 9 has a joining protrusion 91 formed on one side of a circular base 90.

Figure 8:
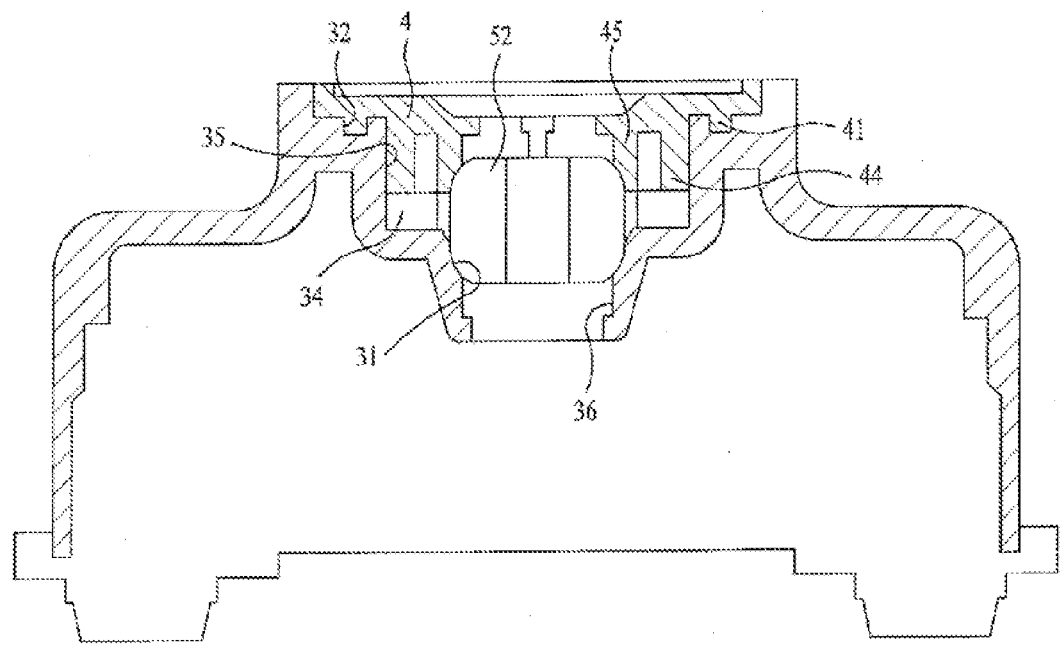
FIG. 8 is a sectional view showing a joined state of the upper bracket of the fan motor and the felt cover according to another preferred embodiment of the present invention.

The joining protrusion 91 is joined to a groove formed at a corresponding position of the lower bracket or the upper bracket, such that the felt cover 9 is fixedly joined to the lower bracket or the upper bracket FIG. 8 is a sectional view showing a joined state of the upper bracket of the fan motor and the felt cover. The base 90 has a rotary shaft hole 92 formed at the central part thereof for passing the rotary shaft therethrough. In the case that the felt cover 9 is used as the lower felt cover, the rotary shaft hole 92 is not necessary. Alternatively, in the case that the felt cover 9 is used as the lower felt cover in the state where the rotary shaft hole 92 is formed, the rotary shaft hole 92 may be stopped by an additional member.

A felt supporting portion 93 is protrudingly formed inside of the joining protrusion 91. The felt supporting portion 93 serves the same role as the lower felt supporting portion 23 or the upper felt supporting portion 44 described above, namely, serves to support felt containing lubricating oil to keep its original position.

A bearing supporting portion 94 is protrudingly formed inside the felt supporting portion 93. The bearing supporting portion 94 is divided into three segments by cut portions 94a, 94b and 94c, such that the divided portions of the bearing supporting portion 94 are minutely spread in order to prevent that the bearing supporting portion 94 strongly presses the bearing and lowers a rotation performance of the bearing. It is not necessary to form three cut portions 94a, 94b and 94c, and it is sufficient to form at least two cut portions as occasion demands. However, the cut portions must be located symmetrically in order to prevent eccentricity by the rotation when they support the bearing. An upper portion of the bearing supporting portion 94 has an inclined portion 95 formed according to the outward shape of the bearing abutting on the bearing supporting portion 94. Therefore, the inclined portion 95 of the bearing supporting portion 94 widens an area for supporting the abutting part of the bearing.

FIG. 8 is a sectional view showing a joined state of the upper bracket 3 of the fan motor and the felt cover 4.

As shown in FIG. 8, the upper bracket 3 of the fan motor according to another preferred embodiment of the present invention.

As shown in FIG. 8, the upper bracket 3 of the fan motor according to another preferred embodiment of the present invention has an upper bearing insertion space which is opened toward the upper part, and hence, the fan motor according to the second preferred embodiment is different from the fan motor according to the first preferred embodiment in that the upper felt cover 4 is joined to the upper bracket 3 to the upper portion, and other structures of the fan motor according to the second preferred embodiment are identical or similar with those of the fan motor according to the first preferred embodiment.

An upper bearing 52 is inserted from above an upper bearing insertion space 35 and seated on an upper bearing seating portion 31. The upper bearing seating portion 31 has an upper oil return washer insertion portion 36 formed below the upper bearing seating portion 31, and thus, an upper oil return washer (not shown) is inserted into the upper oil return washer insertion portion 36.

An upper felt 34 is inserted outside of the upper bearing 52, and is supported by an upper felt supporting portion 44 formed on the upper felt cover 4. An upper portion of an upper bearing 52 is supported by an upper bearing supporting portion 45 formed on the upper felt cover 4.

The upper felt cover 4 has an upper joining protrusion 41 which is joined to an upper joining groove 32 of the upper bracket. It is preferable that the outer circumferential surface of the upper felt supporting portion 44 of the upper felt cover 4 get in contact with the inner circumferential surface of the upper bearing insertion space 35.

As described above, while the present invention has been particularly shown and described with reference to the example embodiments thereof, it will be understood by those of ordinary skill in the art that the above embodiments of the present invention are all exemplified and the present invention is not limited to the example embodiments. It should be also understood that the protective scope of the present invention is defined by the following claims and all changes and modifications within the scope and spirit of the present invention belong to the technical scope of the present invention.

The invention claimed is:

1. A fan motor comprising:
a lower bracket through which a rotary shaft passes at the central portion thereof, the lower bracket having a lower bearing insertion space formed around the rotary shaft outside of the central portion;
an upper bracket through which the rotary shaft passes at the central portion thereof, the upper bracket having an upper bearing insertion space formed around the rotary shaft and opened at the lower portion of the upper bearing insertion space;
a lower bearing forcedly pressed and fixed at a lower bearing seating portion formed above the lower bearing insertion space;
an upper bearing forcedly pressed and fixed at an upper bearing seating portion formed above the upper bearing insertion space;
a rotor rotatably joined to the rotary shaft inside the upper bracket;
a stator located around the rotor;
a lower felt cover having a lower bearing supporting portion for supporting the lower portion of the lower bearing; and
an upper felt cover having an upper bearing supporting portion for supporting the lower portion of the upper bearing.

2. The fan motor according to claim 1, further comprising:
a lower felt located around the lower bearing; and
a lower felt supporting portion formed around the lower bearing supporting portion of the lower felt cover for supporting the lower felt.

3. The fan motor according to claim 1, further comprising:
an upper felt located around the upper bearing; and
an upper felt supporting portion formed around the upper bearing supporting portion of the upper felt cover for supporting the upper felt.

4. A fan motor comprising:
a lower bracket through which a rotary shaft passes at the central portion thereof, the lower bracket having a lower bearing insertion space formed around the rotary shaft outside of the central portion;
an upper bracket through which the rotary shaft passes at the central portion thereof, the upper bracket having an upper bearing insertion space formed around the rotary shaft and opened at the upper portion of the upper bearing insertion space;
a lower bearing forcedly pressed and fixed at a lower bearing seating portion formed above the lower bearing insertion space;
an upper bearing forcedly pressed and fixed at an upper bearing seating portion formed below the upper bearing insertion space;
a rotor rotatably joined to the rotary shaft inside the upper bracket;
a stator located around the rotor;
a lower felt cover having a lower bearing supporting portion for supporting the upper portion of the lower bearing; and
an upper felt cover having an upper bearing supporting portion for supporting the upper portion of the upper bearing.

5. A felt cover comprising:
a circular base;
a felt supporting portion protrudingly formed on the base; and
a bearing supporting portion protruding from the inner face of the felt supporting portion and being formed in parallel with the felt supporting portion,
wherein the bearing supporting portion comprises at least two cut portions.

6. The felt cover according to claim 5, wherein the base comprises an oil return washer insertion portion formed at the central part thereof and below the bearing supporting portion.

* * * * *